(12) United States Patent
Kratz

(10) Patent No.: US 10,349,633 B2
(45) Date of Patent: Jul. 16, 2019

(54) BIRDHOUSE WITH ENHANCED CARE GIVER ACCESS

(71) Applicant: Roger Kratz, Kildeer, IL (US)

(72) Inventor: Roger Kratz, Kildeer, IL (US)

( * ) Notice: Subject to any disclaimer, the term of this patent is extended or adjusted under 35 U.S.C. 154(b) by 127 days.

(21) Appl. No.: 15/460,017

(22) Filed: Mar. 15, 2017

(65) Prior Publication Data

US 2018/0077908 A1    Mar. 22, 2018

Related U.S. Application Data

(60) Provisional application No. 62/396,681, filed on Sep. 19, 2016.

(51) Int. Cl.
*A01K 31/14* (2006.01)

(52) U.S. Cl.
CPC .................. *A01K 31/14* (2013.01)

(58) Field of Classification Search
CPC ........ A01K 31/14; A01K 31/18; A01K 31/00; A01K 39/00; A01K 39/012; A01K 39/01; A01K 39/0106; A01K 1/00; A01K 1/03
See application file for complete search history.

(56) References Cited

U.S. PATENT DOCUMENTS

| | | | | |
|---|---|---|---|---|
| 5,000,121 A * | 3/1991 | Daily | ..................... | A01K 31/06 119/461 |
| 5,134,970 A * | 8/1992 | Oh | ......................... | A01K 31/14 119/428 |
| 6,170,437 B1 * | 1/2001 | Jones | ..................... | A01K 31/14 119/428 |
| 6,397,779 B1 * | 6/2002 | Bonne | .................. | A01K 39/012 119/429 |
| 6,477,983 B1 * | 11/2002 | Bette | ..................... | A01K 31/14 119/428 |
| 2014/0123907 A1 * | 5/2014 | James | ................... | A01K 31/06 119/429 |

* cited by examiner

*Primary Examiner* — Kristen C Hayes
(74) *Attorney, Agent, or Firm* — Greer, Burns & Crain, Ltd.

(57) ABSTRACT

A birdhouse is provided with at least four walls that define a birdhouse interior, with at least one of the walls containing an access opening. The interior is further defined by a roof, defining a first, upper end of the interior, which is affixed to at least one of the walls and which is disposed above a floor, which defines a second, opposite end of the interior and is also affixed to at least one of the walls. Furthermore, the birdhouse is provided with a cell phone slot disposed generally adjacent to a top of at least one of the walls, which is dimensioned to slidably accommodate a cell phone with a camera for photographing the birdhouse interior.

24 Claims, 18 Drawing Sheets

BIRDHOUSE WITH ENHANCED CARE GIVER ACCESS

RELATED APPLICATION

This application claims 35 USC 119 priority to U.S. Provisional Application No. 62/396,681, filed Sep. 19, 2016, which is incorporated herein by reference in its entirety.

BACKGROUND

The present invention relates generally to birdhouses, and more specifically to birdhouses equipped with enhanced user access, as well as features for creating a more comfortable environment for the resident birds.

Birdhouses provide a much welcomed shelter to target species of birds that prefer to have a more secure area in which to build a nest, rather than a tree limb or shrub. Unfortunately, despite the protection and seclusion provided by conventional birdhouses, there are still problems of inadequate ventilation. Relatively high temperatures can provide for extremely uncomfortable living conditions, possibly stressing younger hatchlings or unhatched eggs. Conventional bird houses provide ventilation openings, but in some cases, such openings provide access to unwanted guests such as insects or other animals.

Another drawback of conventional birdhouses is the limited access by the birder to observe birds while they reside in the house. Traditional birder access doors startle or scare the birds, leading to abandonment of the nest. Thus, there is a need for an improved birdhouse that addresses the problems identified above.

SUMMARY

The above-listed needs are met or exceeded by the present birdhouse which features a cell phone slot, preferably at the top of the birdhouse which allows for photography within the birdhouse without opening up the birdhouse, which has been known to disturb the resident birds, causing fledglings to jump or fall out of the nest. The cell phone slot is protected by a flexible screen which keeps unwanted insects and other pests out of the interior of the birdhouse. Additionally, in order to keep the resident birds comfortable, while at the same time restricting access to unwanted insects and other animals, cooling fins are provided on the sides of the birdhouse which cool the birdhouse interior by providing a shaded area on the sides of the house without creating additional access openings in walls of the birdhouse. Enhancing this cooling effect, the roof of the birdhouse is dimensioned with a perimeter that is larger than that of the footprint of the birdhouse walls, thus creating an overhang which creates an additional shaded area on the birdhouse. The front of the overhang is further exaggerated, increasing the shaded area on the front side of the birdhouse. Additionally, the birdhouse walls are dimensioned to be tapered from an upper end to a lower end.

More specifically, a birdhouse is provided, with at least four walls that define the birdhouse interior, with at least one of the walls having an access opening. The interior is further defined by a roof affixed to at least one of the walls and defining a first, upper end of the interior. Preferably the roof is disposed above a floor, which defines a second, opposite end of the interior and is also affixed to at least one of the walls. Furthermore, the present birdhouse includes a cell phone slot disposed generally adjacent to a top of at least one of the walls, which is dimensioned to slidably accommodate a cell phone with a camera for photographing the birdhouse interior.

In another embodiment, a birdhouse includes at least four walls that define a birdhouse interior, and with at least one of the walls containing an access opening. The interior is further defined by a roof, defining an upper end of the interior, which is disposed above and is affixed to at least one of the walls. The roof has an area larger than a perimeter of the walls, thus creating an overhang which produces a first shaded area underneath the overhang. Additionally, at least one cooling fin is attached to, and extends away from, at least one of the walls, thus creating a second shaded area underneath the cooling fin. Finally, a floor, affixed to at least one of the walls, defines a lower end of the interior.

DETAILED DESCRIPTION

Figure 1:
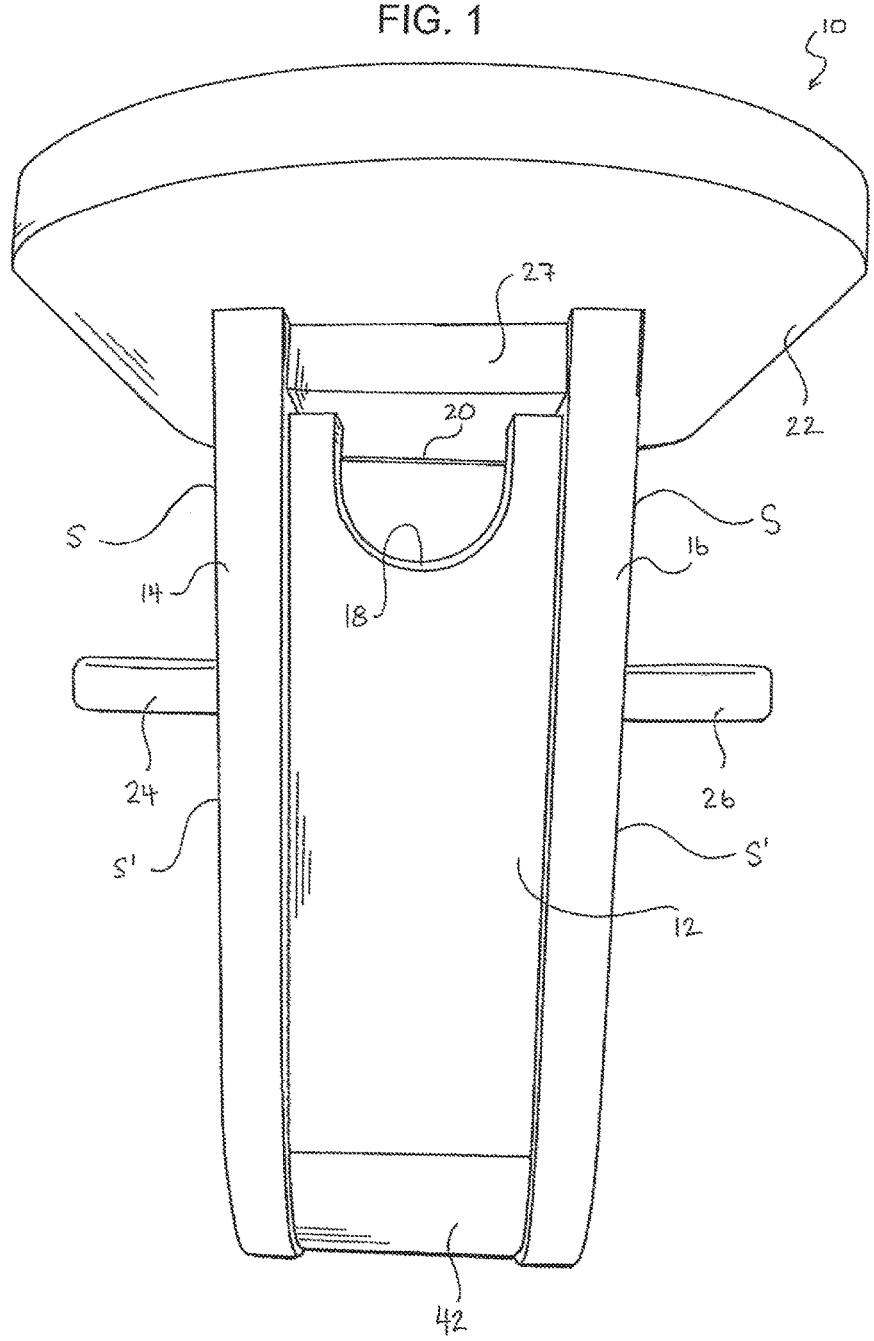
FIG. 1 is a front view of the present birdhouse with cooling fins, cell phone slot, and bottom storage compartment.

Referring now to FIGS. 1-7, the present birdhouse is generally designated 10 and includes a front wall also referred to as a door or front door 12 and side walls 14, 16. The walls define the interior 13 of the birdhouse. The walls 12, 14, 16 are made of any rigid material such as wood, including cedar, or other weather resistant material. In the front door 12, an access opening 18 is dimensioned to allow for birds to enter and exit the interior 13 of the birdhouse 10. The dimensions of the access opening 18 are variable, optionally via reducing inserts (not shown), to accommodate birds of varying species (sizes) or to prevent birds or animals of a certain species to enter the interior 13. Optionally, an access opening wire 20 is provided to prevent larger birds and predators from entering the birdhouse, while still providing the appearance of a large access opening 18. FIG. 1 exemplifies one mounting location for the wire 20; however, additional mounting configurations are anticipated. For example, the wire 20 could be mounted higher or lower on the access opening 18, to effectively create a larger or smaller opening to prevent different types of birds/predators from entering the birdhouse interior 13. Alternately, multiple wires 20, are contemplated.

Figure 3:
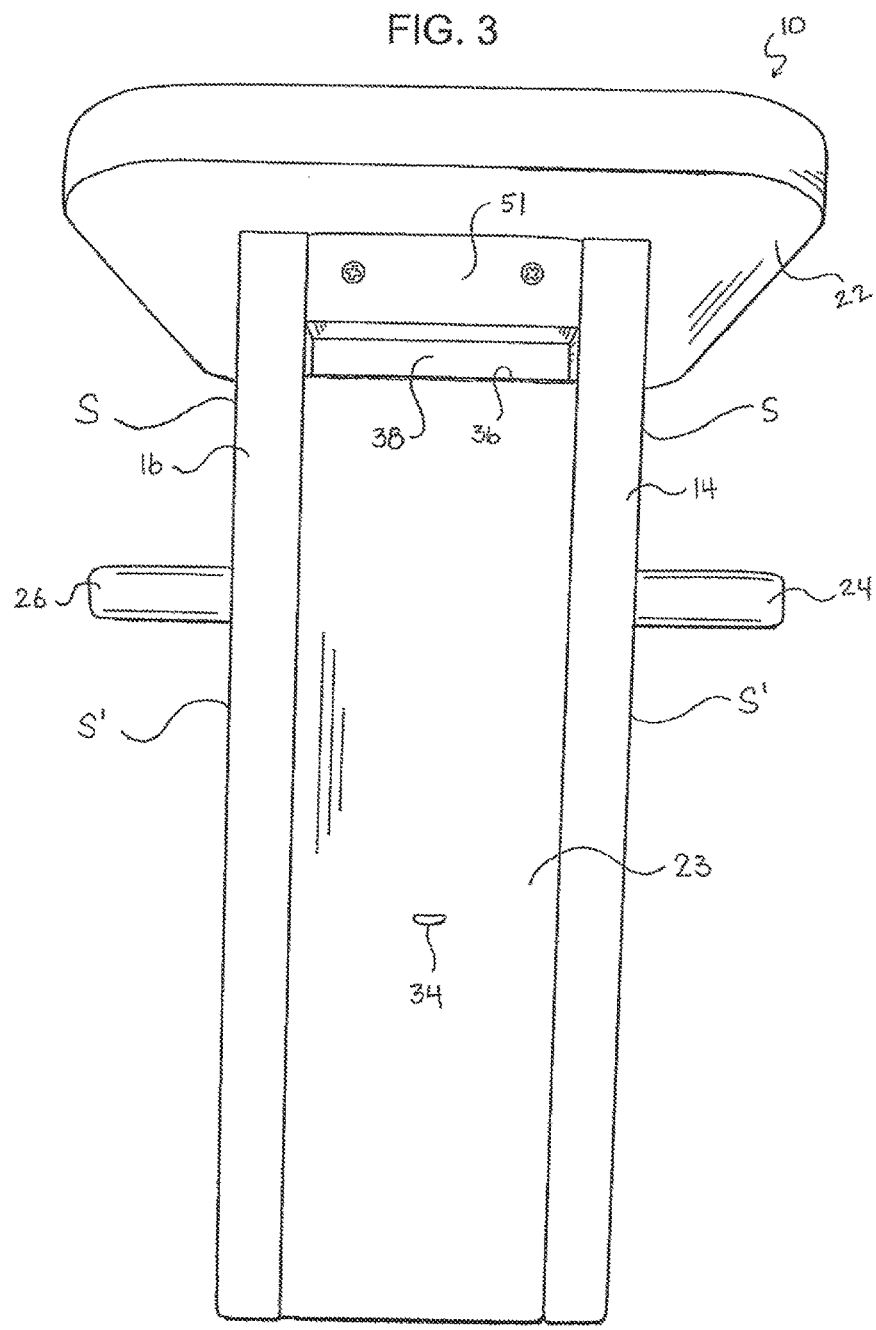
FIG. 3 is a rear view of the present birdhouse.

Further defining the interior 13 of the birdhouse 10 and displaced above the walls 12, 14, 16 is a roof 22, which is affixed to at least one of the walls and a ceiling (discussed below). The roof 22 is contemplated as being made of any rigid, weatherproof material, including cedar. In a preferred embodiment, the roof 22 has an overall perimeter that is larger than a perimeter defined by the walls 12, 14, 16 and a rear wall 23 (FIG. 3). The larger perimeter of the roof creates a shaded area S along the side 14, 16, front 12, and rear wall 23 of the birdhouse 10. The rear wall 23 is attached to the respective side walls 14, 16 and to the roof 22 and further defines the interior 13. This shaded area S has a cooling effect on the birdhouse 10, thus reducing the temperature in the interior 13 to provide a more comfortable environment for the resident birds. In a particularly preferred embodiment, the roof 22 extends further past the front wall 12 of the birdhouse than any of the side 14, 16 or rear walls 23. This configuration increases shading to the front of the birdhouse 10.

Additionally, FIG. 1 shows two optional cooling fins 24, 26 secured to side walls 14, 16 respectively. The cooling fins 24, 26 extend away from the side walls 14, 16 such that additional shaded areas S', in addition to the shaded areas S created by the roof 22 as described above, are created beneath the cooling fins 24, 26. The size and shape of the cooling fins 24, 26 may vary depending on the desired amount of shade and the overall size of the birdhouse 10, and they may be comprised of any sturdy material, including without limitation: metal, plastic, wood, or other similar materials. The additional shaded areas S' created by the fins 24, 26 provide additional cooling effects on the birdhouse 10, further reducing the temperature in the birdhouse interior 13 for added comfort to the resident birds. More specifically, the shaded areas S' reduce temperature in a lower area 13' (FIGS. 6, 7) of the interior 13 where the birds typically reside while in the birdhouse 10.

In order to further facilitate cooling of the birdhouse interior 13, a ceiling 27 is optionally disposed immediately below the roof 22 and generally above the interior 13. The ceiling 27 has a perimeter defined by the walls 12, 14, 16, 23 and is affixed to at least one of the walls and/or the roof 22. Cooling is enhanced in that the ceiling 27 provides an additional thickness that separates the heat of the roof 22 from the birdhouse interior 13.

Figure 2:
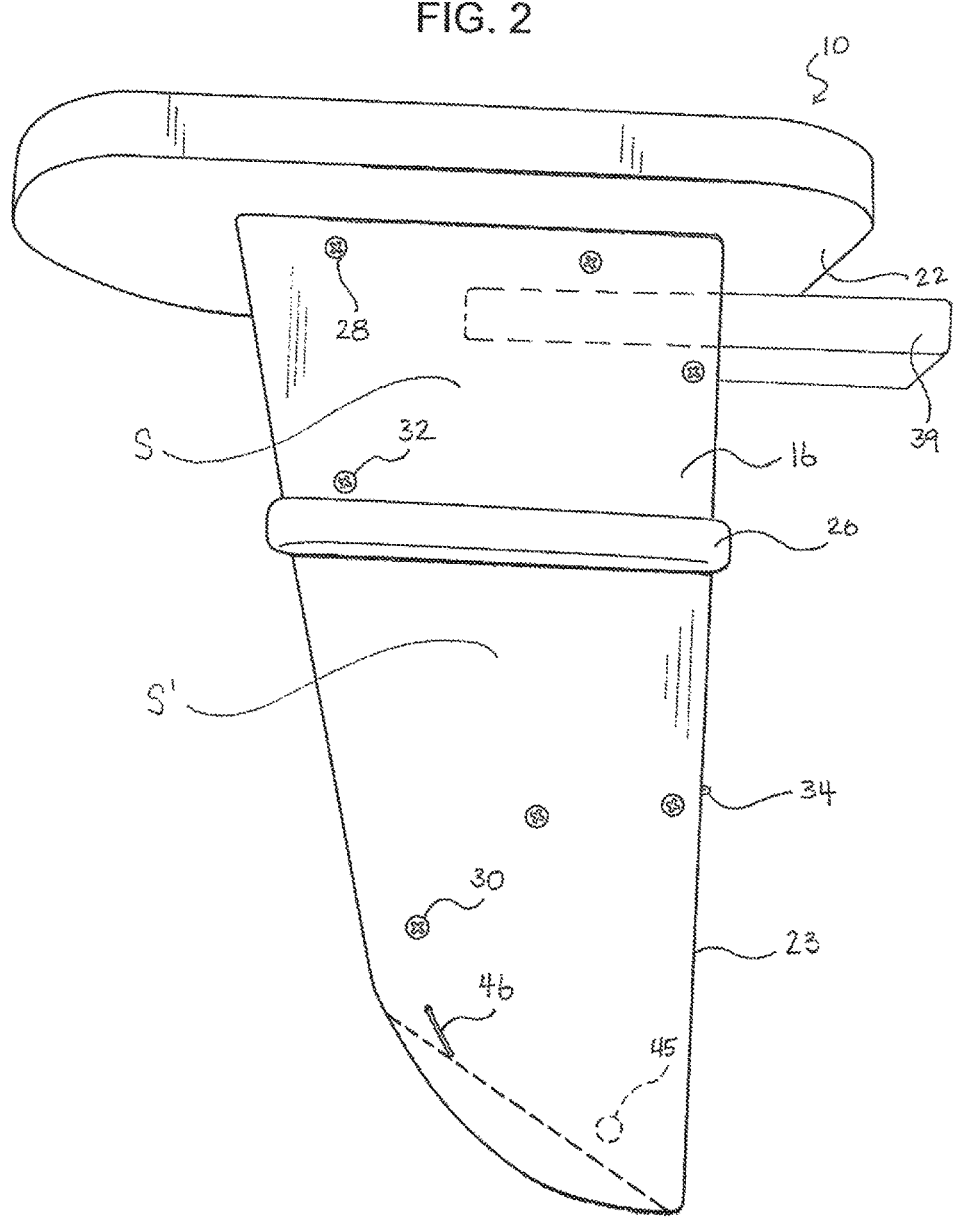
FIG. 2 is a right side view of the birdhouse of FIG. 1.

FIG. 2 shows a side view of the birdhouse 10. In a preferred embodiment, the side walls 14 (FIG. 1), 16 have a top width and a bottom width, the top width being greater than the bottom width. This feature provides a greater surface area of the birdhouse 10 to utilize the shade provided by the roof 22. Optionally, FIG. 2 shows a curved/rounded edge located near the bottom of side wall 16; however, other embodiments may include a straight and/or tapered edge (shown in phantom in FIG. 2), rather than a curved edge, and the corresponding cover (42 discussed below) will have a complementary curve or taper to match the sidewall.

Also highlighted in FIG. 2 are the fasteners 28 of the side wall to the ceiling 27 or, alternately, to the roof 22 and rear wall 23 of the birdhouse 10. The fasteners 28 are preferably screws, however other known fasteners are contemplated, including nails, staples, adhesive, combinations of the above and the like.

Figure 6:
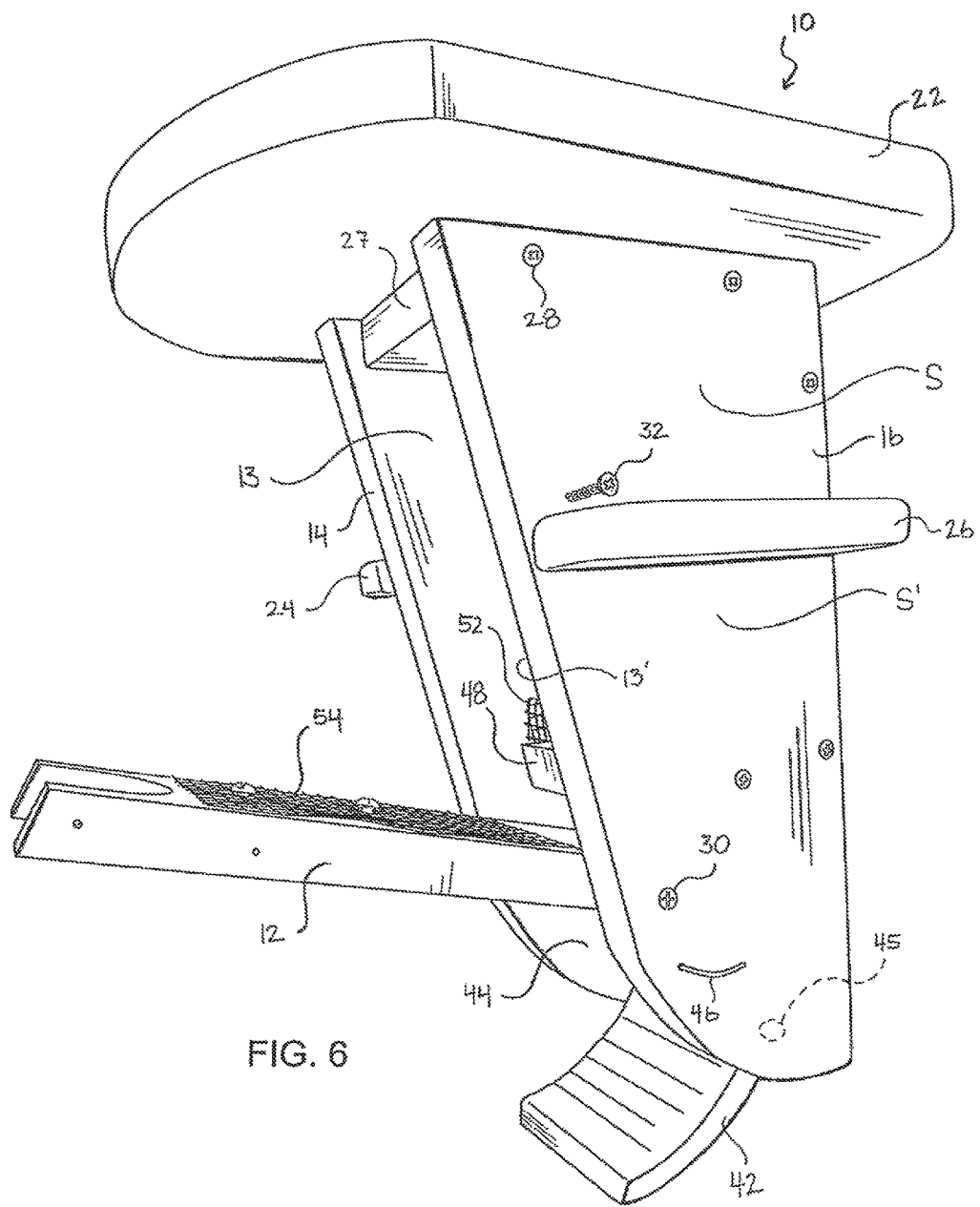
FIG. 6 is a side perspective view of the present birdhouse with one of the birdhouse walls and the storage area cover in the open position.
Figure 7:
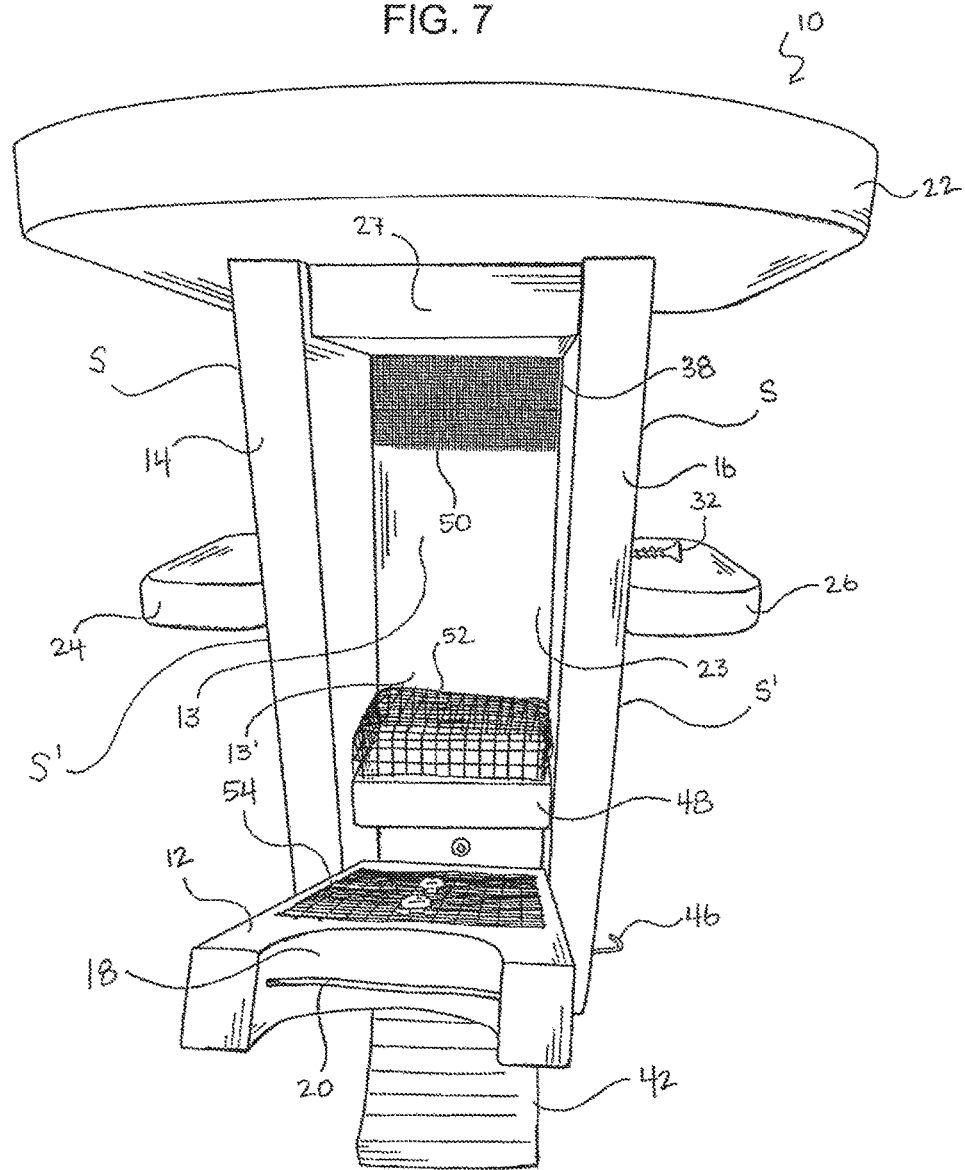
FIG. 7 is a front perspective view of the present birdhouse with one of the birdhouse walls and the storage area cover in the open position.

Referring now to FIGS. 2, 6 and 7 a particularly preferred embodiment of the present bird house 10 is depicted in which the front door 12 is hinged, generally adjacent to a bottom of the wall, around a pivot point 30. Additionally, the front door 12 is removably restrained, generally adjacent to the top of the wall, via a restraint 32. This pivot point 30 and the removable restraint 32 provide for the front door 12 to be movable between an open position, when the removable restraint 32 is released and the front door 12 is pivoted in a first direction (counter-clockwise when viewed according to FIGS. 2, 6) about the pivot point 30 and a closed position, when the front door 12 is pivoted in a second direction, opposite the first (clockwise when viewed according to FIG. 2, 6), about the pivot point 30 and the removable restraint 32 is engaged. In the fully open position, the front door 12 is able to be rotated until the plane of the wall is generally parallel with the roof 22. In the closed position, the front door 12 is removably secured so as to be generally flush with front edges of the side walls 14, 16. This pivoting action allows for the caregiver to access the interior 13, while at the same time keeps the front door 12 of the birdhouse 10 attached, providing convenient, easy access to the interior 13 (desired for cleaning, maintaining, monitoring the birdhouse 10 and its inhabitants, etc.). The pivot point 30 and removable restraint 32 shown in FIG. 2 are provided by screws, however, the pivot point 30 and removable restraint 32 are not limited, and other known fasteners are contemplated as stated above.

Also shown in FIG. 2 is an attachment 34, such as a loop, eyelet, hook or the like which allows for a tool (not shown) such as a screwdriver to be removably affixed to the rear wall 23 of the birdhouse. In a preferred embodiment, the tool is used to engage and release the removable restraint 32 used to open and close the front door 12. The attachment 34 provides for easy access to the tool and limits the likelihood that the tool will be misplaced.

Figure 9:
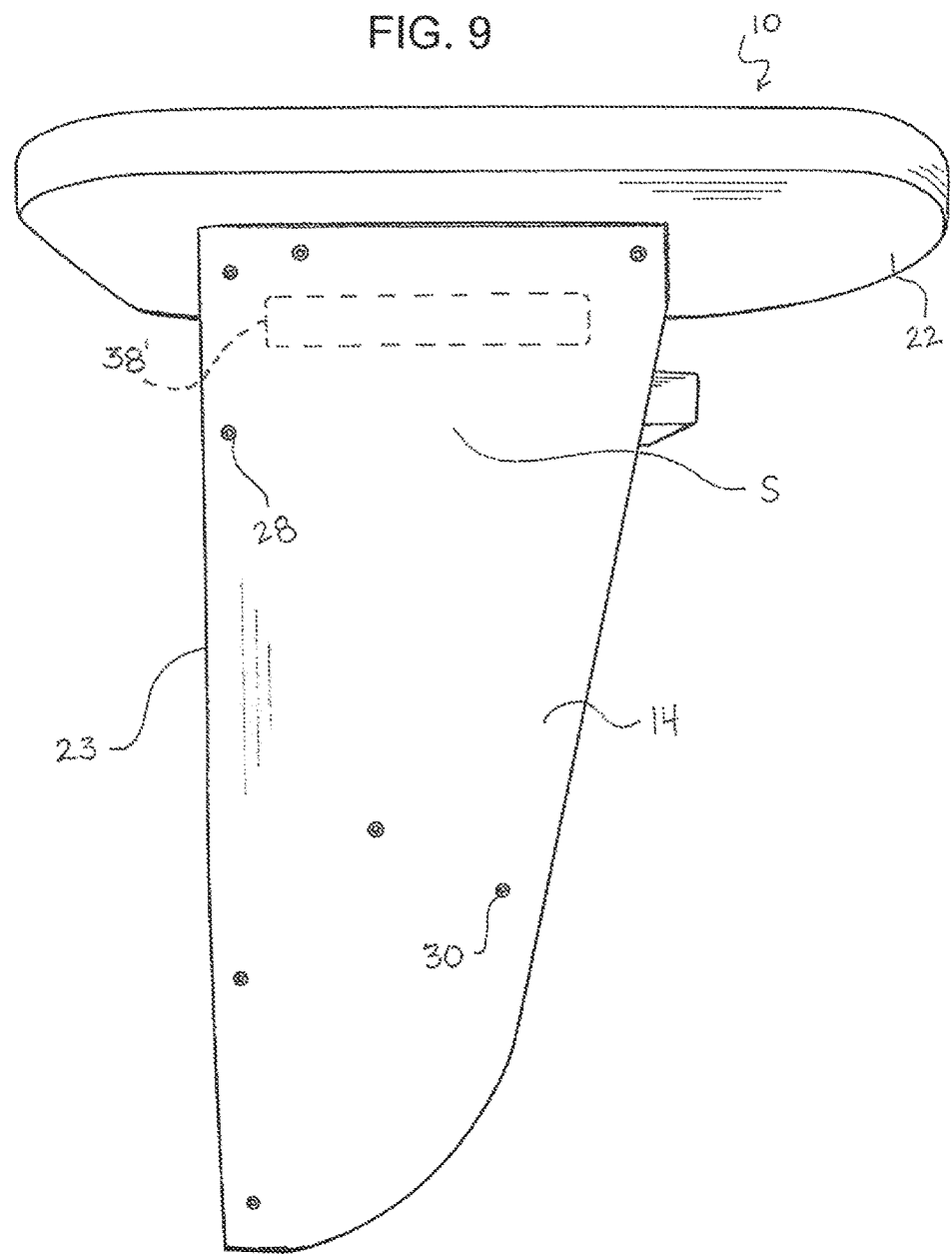
FIG. 9 is a left side view of the birdhouse of FIG. 8.
Figure 10:
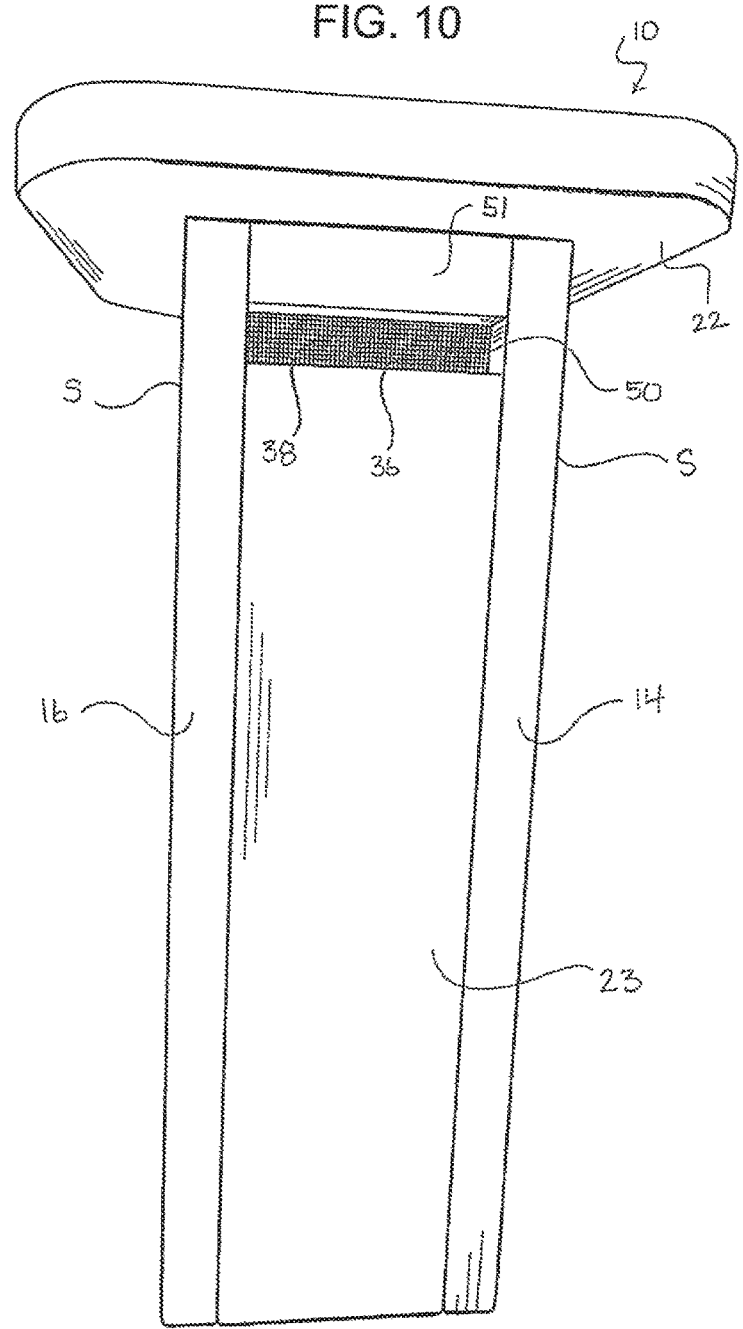
FIG. 10 is a rear view of the birdhouse of FIG. 8.
Figure 11:
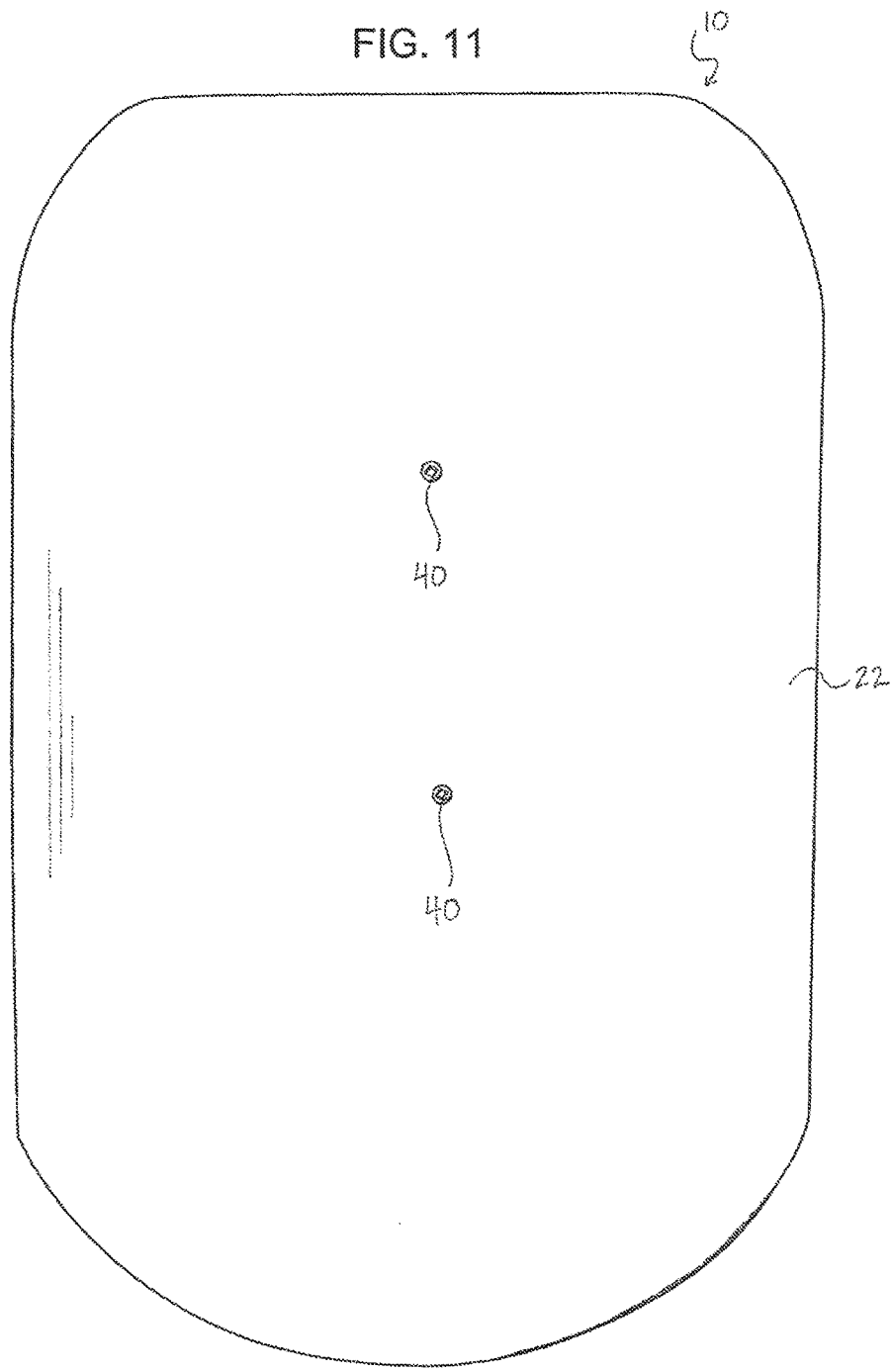
FIG. 11 is a top view of the birdhouse of FIG. 8.
Figure 12:
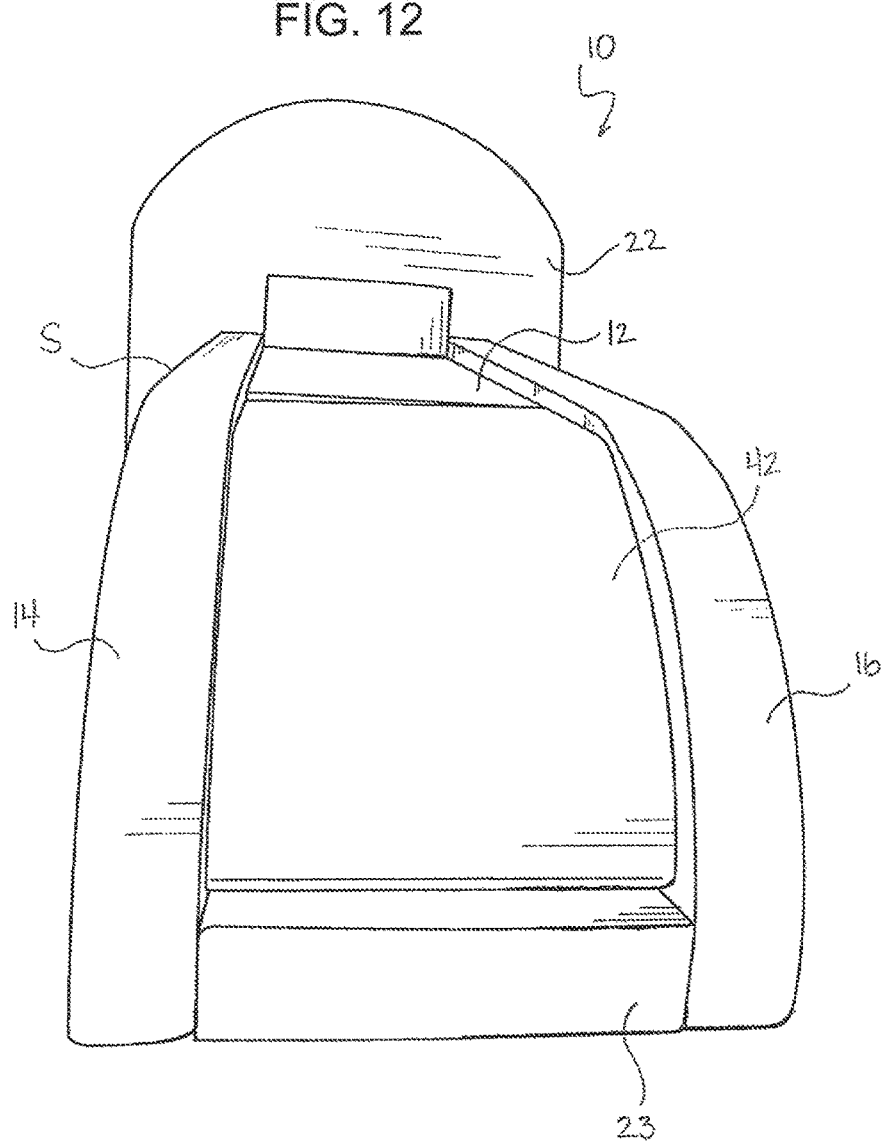
FIG. 12 is a bottom view of the birdhouse of FIG. 8.
Figure 13:
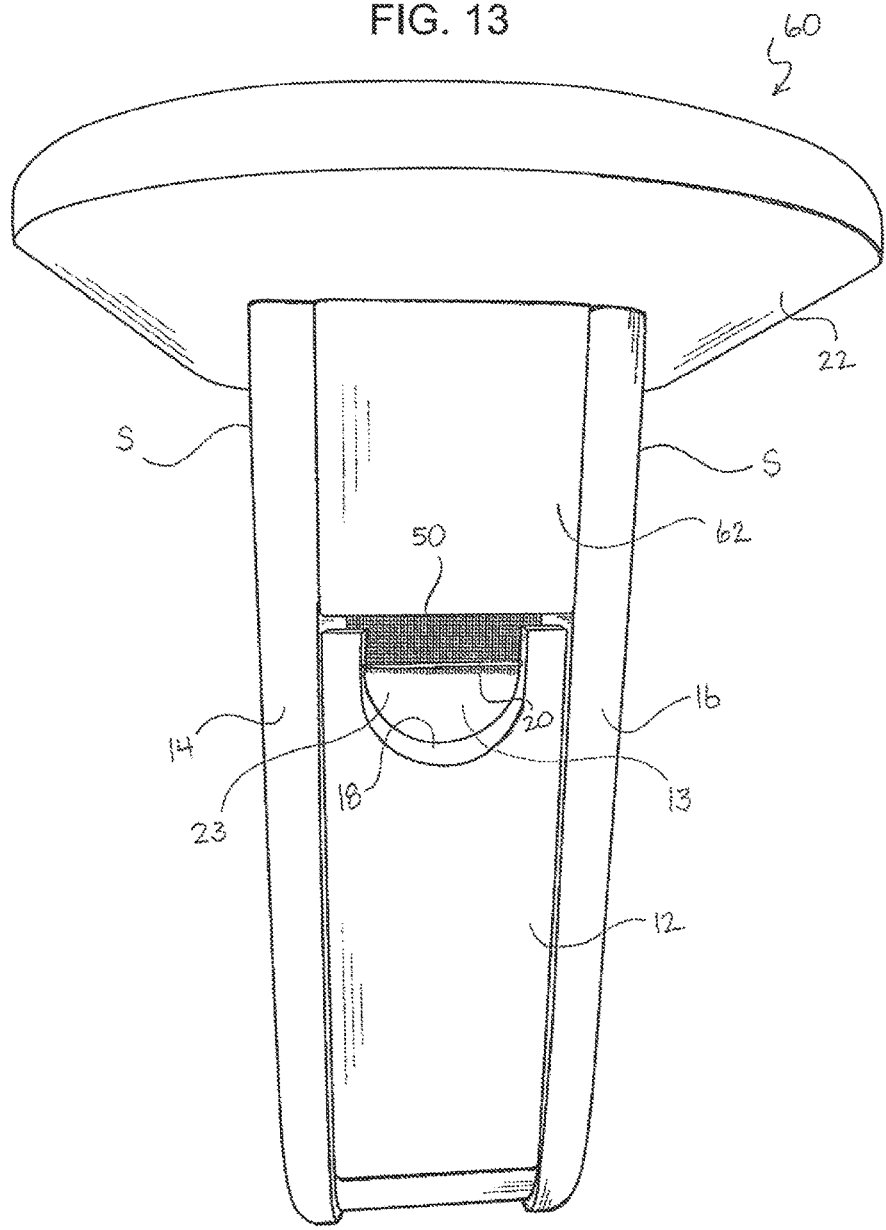
FIG. 13 is a front view of yet another embodiment of the present birdhouse.

Referring now to FIG. 3, generally adjacent to a top 36 of the rear wall 23, a cell phone slot 38 is disposed that is dimensioned to slidably accommodate a conventional camera-equipped cell phone 39 (shown in phantom in FIG. 2) for photographing and/or monitoring the birdhouse interior 13. The cell phone slot 38 is preferably dimensioned to accommodate the height and width of the cell phone 39. The size and position of the cell phone slot 38 has the benefit of allowing for photographs to be taken of the birdhouse interior 13 while reducing the chances of disturbing any resident birds. The cell phone slot 38 additionally has the added benefit of promoting airflow into the interior 13 to supplement air flow through the front door access opening 18, enhancing cooling of the birdhouse interior 13. FIG. 3 shows the cell phone slot 38 generally adjacent to a top 36 of the rear wall 23; alternately, it is anticipated that the cell phone slot 38 may be disposed generally adjacent to a top of one of the side walls 14, 16 (shown in FIG. 9, in phantom 38'). This alternate location for the cell phone slot 38 accounts for differing sizes of cell phones, different camera orientations of various cell phones, and different mounting/installation configurations of the birdhouse.

Figure 4:
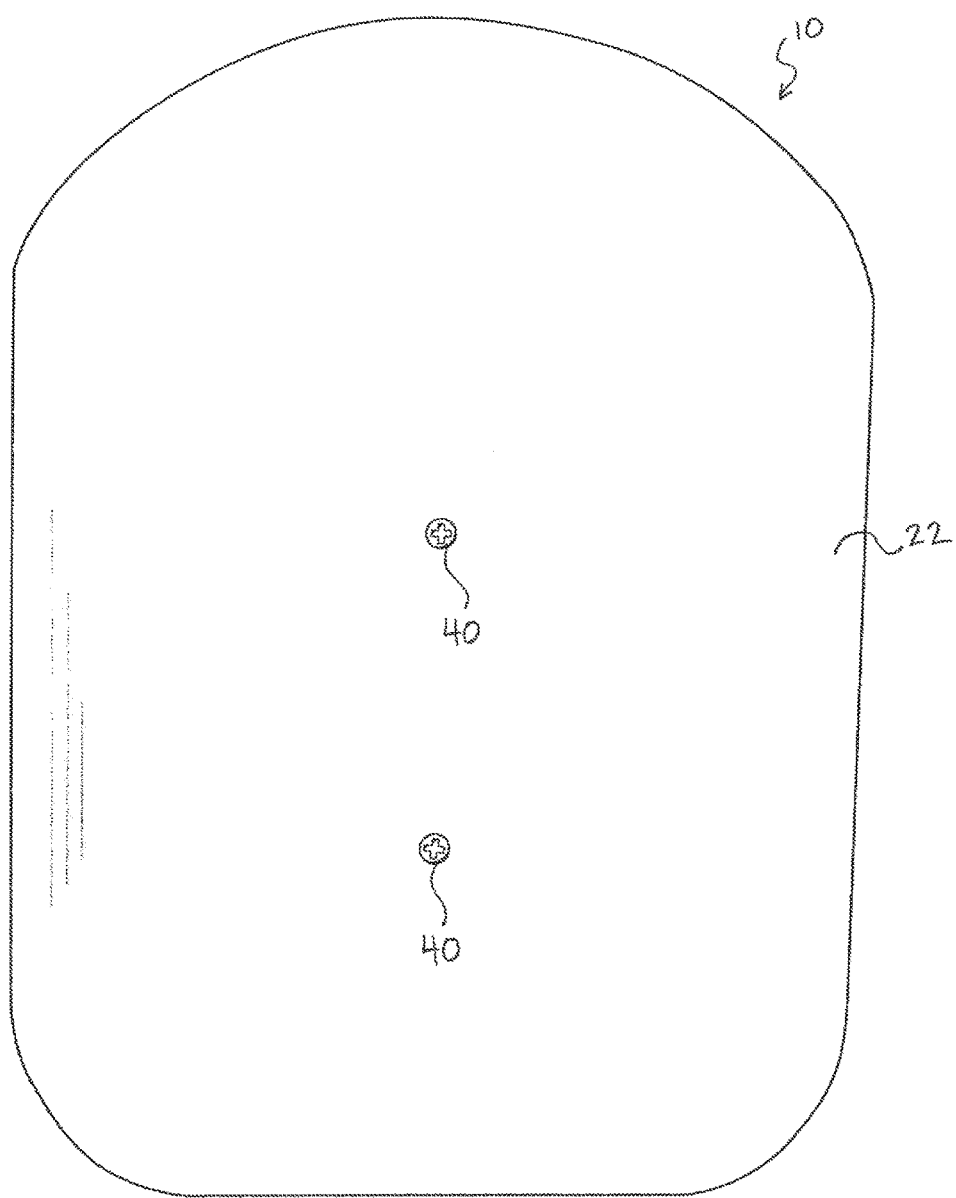
FIG. 4 is a top view of the present birdhouse.

FIG. 4 shows the top view of the birdhouse 10 and displays the roof 22 and at least one roof fastener 40 used to secure the roof 22 to the side and rear walls 14, 16 and 23 and/or ceiling 27. The roof fasteners 40 shown in FIG. 4 are preferably screws, however, other known fasteners are contemplated as discussed above.

Figure 5:
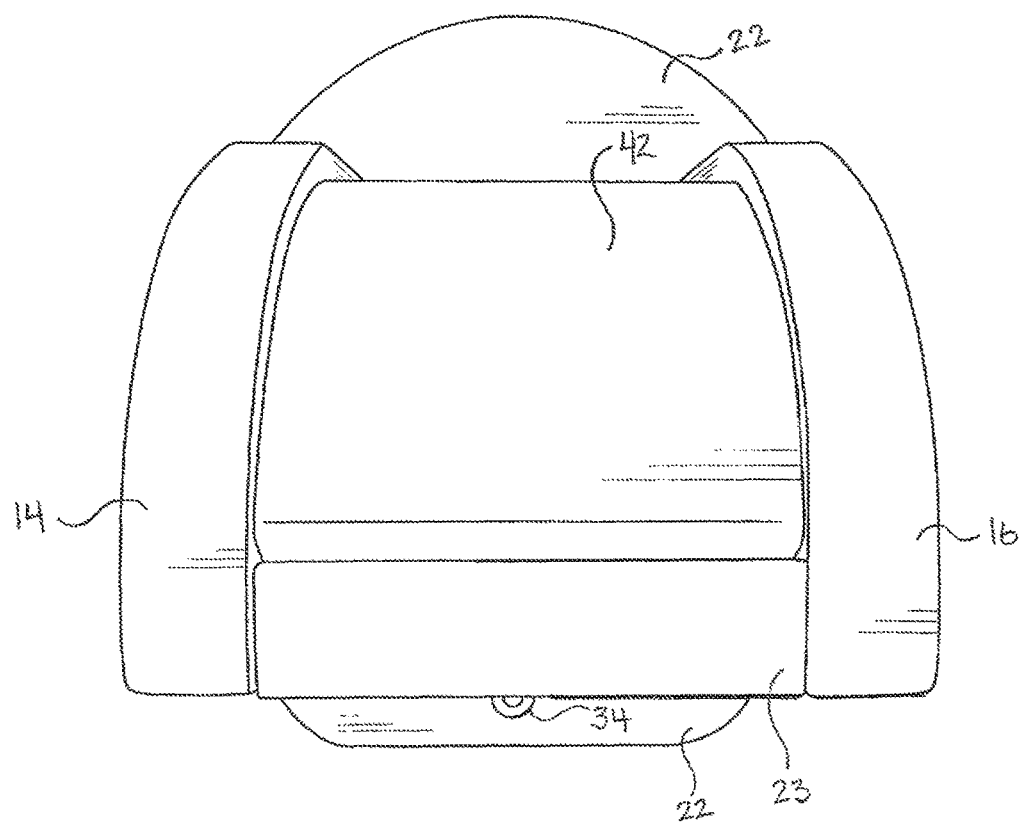
FIG. 5 is a bottom view of the birdhouse of FIG. 1.

Referring now to FIG. 5, a storage area cover 42 is removable for allowing access to the storage area 44, (FIG. 6). Alternately, as displayed in FIG. 6, the storage area cover 42 is hinged around a pivot point 45 (FIG. 6) which is generally adjacent to the bottom of the cover. The storage area cover 42 may be comprised of any sturdy material, including without limitation: metal, plastic, wood, or other similar materials. The cover 42 is also removably restrained, generally adjacent to the top of the cover, via at least one removable cover fastener 46. Using the pivot point 45 and the cover fastener 46 allows for the storage area cover 42 to be movable between an open position, when the removable cover fastener 46 is released and the cover 42 is pivoted in a first direction (counter-clockwise when viewed according to FIG. 6) about the pivot point 45 and a closed position, when the cover is pivoted in a second direction, opposite the first (clockwise when viewed according to FIG. 6), about the pivot point and the cover fastener 46 is engaged. In the fully open position, the cover 42 is rotatable to gain full access to the storage area 44. In the closed position, the cover 42 is removably secured to be generally flush with the front edges of the side walls 14, 16. The cover fastener 46 is preferably a metal peg that engages the cover 42 when the cover is in the closed position and the peg is slidably moved toward the cover, however, the cover fastener 46 is not limited to the slidable metal peg shown and may include any number of pins, fasteners, latches, or other hardware mechanisms known in the art.

As shown in FIGS. 6 and 7, the storage area 44 is defined by the two side walls 14, 16, the rear wall 23, the storage area cover 42 and the birdhouse floor 48, which is affixed to at least one of the walls 12, 14, 16, and/or 23. In a preferred embodiment, the storage area 44 is dimensioned to accommodate the following birdhouse maintenance kit: at least one of a bar of soap, used to coat the interior and exterior horizontal surfaces of the birdhouse 10 to prevent the attachment of wasp or hornet nests; a scraper or putty knife and a brush, used to clean the interior of the birdhouse when necessary; VASELINE® petroleum jelly, applied to a birdhouse pole or support to prevent ants from climbing the pole and accessing the birdhouse; TERRO® ant killer dust, sprinkled under an ant infested bird nest to rid the birdhouse of ants; diatomaceous earth powder, to prevent blow-flies from entering the birdhouse and infesting the nest; a laundry bag and Van Ert Trap sparrow trap, used to capture and remove sparrows, particularly European House Sparrows, or other unwanted birds or animals from the birdhouse interior 13; and/or any other items useful to the birder for birdhouse maintenance, cleaning, or otherwise, which are known in the art.

Referring now to FIG. 7, to further deter unwanted animals and insects, particularly wasps, hornets, flies, and blow-flies, the birdhouse interior 13 is provided with a number of features. Specifically, the cell phone slot 38 is covered on the interior of the birdhouse with a flexible screen 50 designed to prevent wasps, hornets, flies, blow-flies and other insects from entering the birdhouse interior 13. It is preferred that the screen 50 is flush with an interior side of the rear wall 23 to prevent any gaps that may allow entry of insects. To prevent interference with movement of the cell phone 39 in the cell phone slot 38, the flexible screen 50 is preferably affixed only to an interior side of the ceiling 27, the roof 22, or the rear wall 23, thus allowing the screen to flex toward the ceiling, the roof, or the rear wall when a cell phone is inserted into the cell phone slot 38 and not interfere with the operation or view of the camera. Upon removal of the cell phone 39 from the cell phone slot 38, the flexible screen 50 is designed to return to its original position, flush with the interior of the rear wall 23.

In a preferred embodiment, the flexible screen 50 is affixed between the birdhouse ceiling 27 and a screen securement panel 51, which is disposed generally above the cell phone slot 38 and is affixed to at least one of the walls 14, 16, the roof 22, and/or the ceiling 27. Alternately, the flexible screen is affixed between the birdhouse roof 22 and the screen securement panel 51. As used here, in relation to the flexible screen 50, "affixed" includes chemical adhesive, screws, staples, fasteners, or other known fastening technologies.

An additional feature designed to improve the experience of birds within the birdhouse interior 13 is a sturdy mesh base 52 which is disposed above and in contact with a top of the floor 48. The mesh base 52 is sturdy enough to support a nest and all of the birdhouse inhabitants and is used to raise the nest from the floor 48 to prevent contact of blowfly larvae which suck blood from bird nestlings, possibly leading to anemia or death of fledglings or hatchlings and promotes ventilation underneath the nest, thus keeping the nest dry. The mesh base 52 may be made of any sturdy material, including without limitation: metal, plastic, fabric, or other similar materials.

Referring now to FIGS. 6 and 7, an additional feature of the birdhouse interior 13 is a mesh member 54 affixed to an interior face of at least one of the walls 12, 14, 16, 23 and which covers a majority of the interior face. As shown in FIGS. 6 and 7, the mesh member 54 is attached to the interior face of front door 12. The mesh member 54 is used by young hatchlings to climb out of the nest and access the access opening 18, in order to facilitate easy fledging when the hatchling or fledgling is ready, and is preferably secured by fasteners as described above. The mesh member 54 may be made of any sturdy material, including without limitation: metal, plastic, fabric, or other similar materials. Alternately, in another embodiment, the functionality of the mesh member 54 is accomplished via notches or steps on the interior face of at least the wall 12, which enables climbing of the wall by hatchlings or fledglings.

Figure 8:
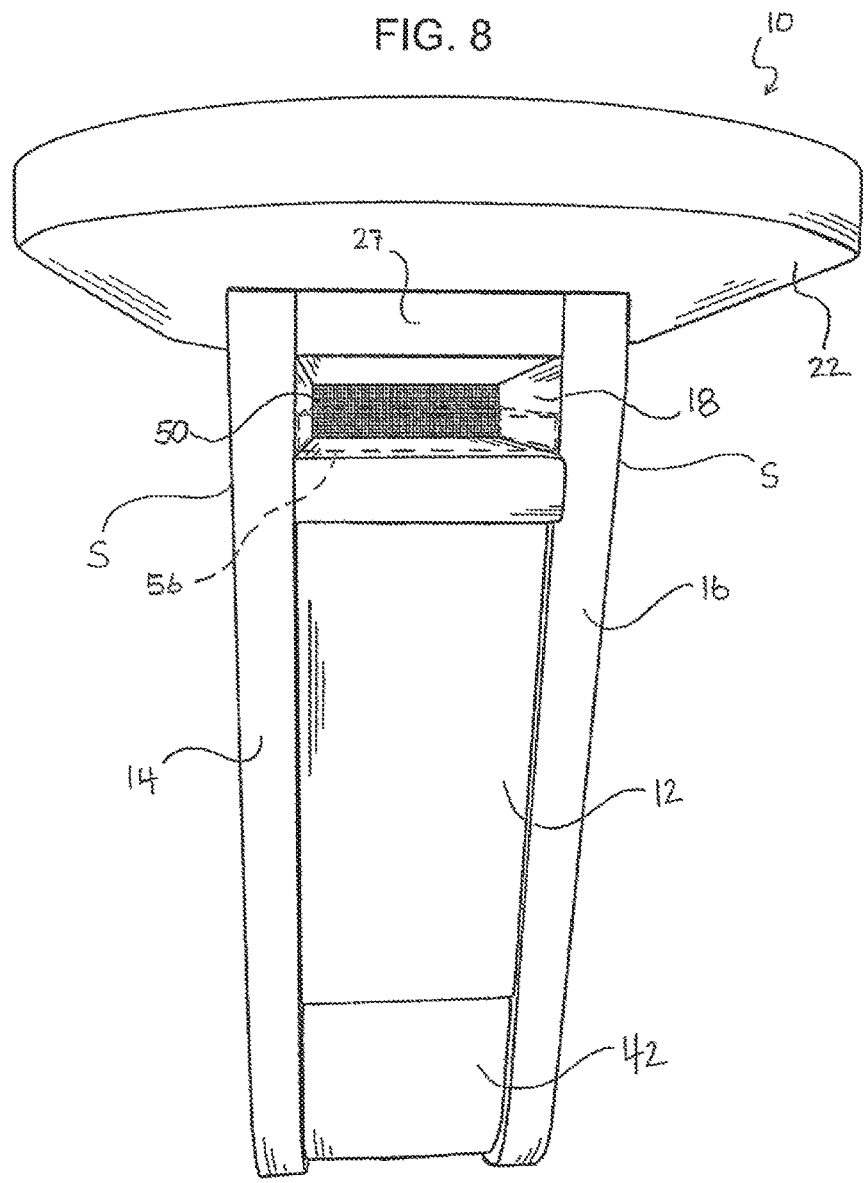
FIG. 8 is a front view of another embodiment of the present birdhouse.

FIG. 8 shows a birdhouse 10 with an alternately shaped access opening 18 to accommodate birds of different species (and sizes). This access opening 18 (in addition to the access opening shown in FIG. 1) may optionally be resized via reducing inserts 56. In alternate embodiments, the reducing inserts may be made of wire (as shown in FIG. 1, access opening wire 20); one or more screws affixed to the front wall 12 and projecting into the access opening 18 (not shown); or wood, plastic, or metal inserts 56, dimensioned to slidably rest upon the front wall 12, to reduce the dimension of the access opening 18. The reducing insert 56, optionally is affixed to the front wall 12 via glue, screws, nails, staples, tacks, fasteners, or other known fastening technologies.

Referring now to FIGS. 13-18, a second birdhouse embodiment is generally designated 60, and components of the birdhouse 10 that are shared with birdhouse 60 are identified with identical reference numbers. The following shared components are also included in, or considered suitable for, the second embodiment: front, side, and rear walls 12, 14, 16, 23; interior and lower area of the interior 13, 13'; access opening and access wire 18, 20; roof 22; cooling fins and shaded areas 24, 26, S, S'; ceiling 27; side wall securement 28; front wall pivot point and restraint 30, 32; attachment 34; cell phone slot 38, 38'; roof fastener 40; floor 48; cell phone slot screen and screen securement panel 50, 51; mesh base and mesh member 52, 54; and reducing inserts 56. A distinctive feature of the birdhouse 60 is a drawer compartment front panel 62 which defines one side of a storage area 63 (FIG. 18) disposed above the birdhouse interior 13 the storage area 63 being analogous to the storage area 44 described above. The storage area 63 is defined on all but one side by the drawer compartment front panel 62 shown in FIG. 13; side walls 14, 16 shown in FIGS. 13-15, 17, 18; drawer ledge (not shown) analogous to the ceiling 27 in that it defines an upper end of the birdhouse interior 13 which supports the bottom of a drawer 64 (shown in FIG. 18); and roof 22 shown in FIGS. 13-18. The drawer compartment 63 is dimensioned to slidably accommodate the drawer 64 which is movable between a closed position wherein the drawer is enclosed within the storage area 63 and an exterior of the drawer face 66 is flush with the exterior rear faces 67 of the side walls 14, 16 and an open position wherein the drawer may be completely removed from the birdhouse 60 to access its contents.

Figure 14:
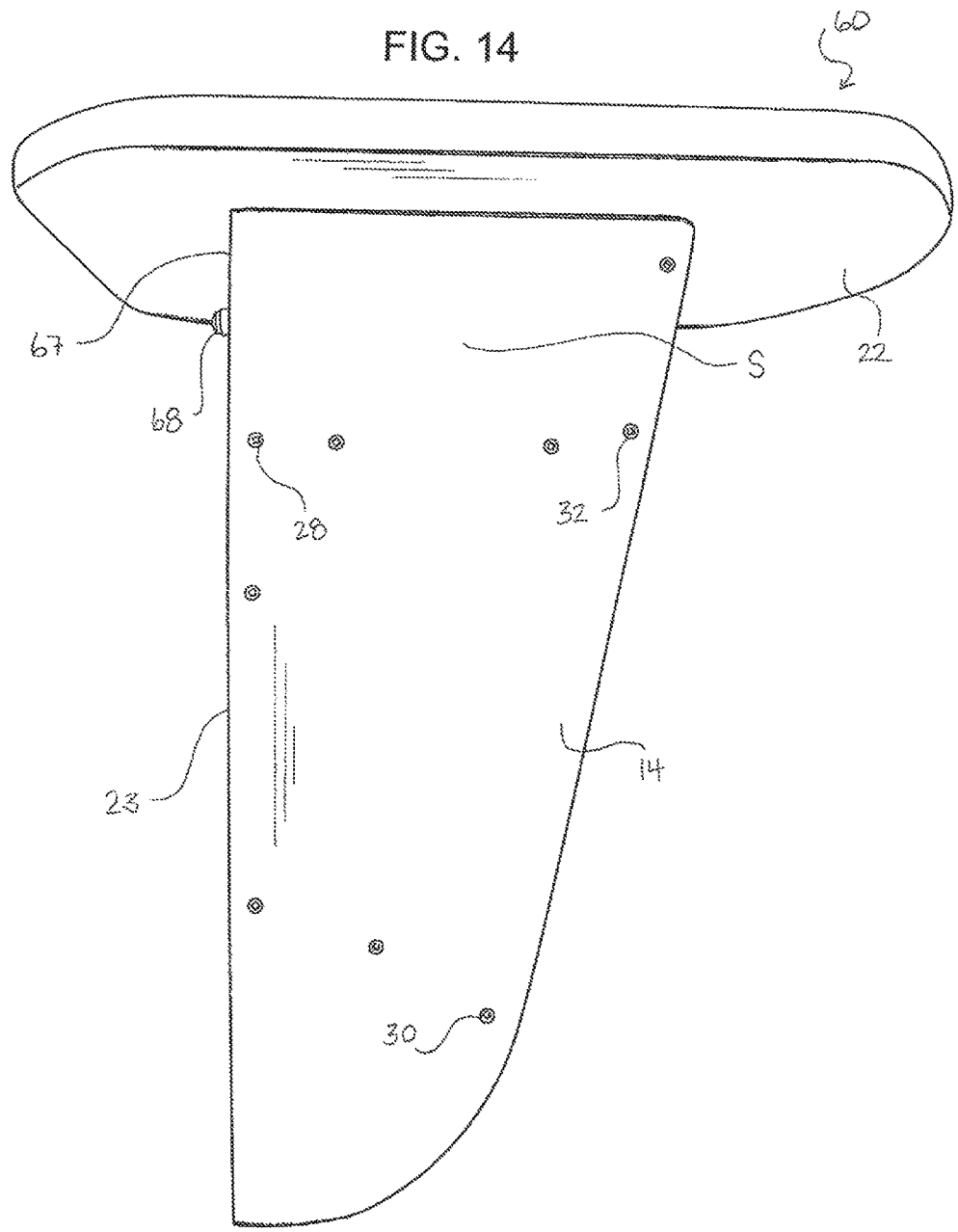
FIG. 14 a left side view of the birdhouse of FIG. 13.
Figure 15:
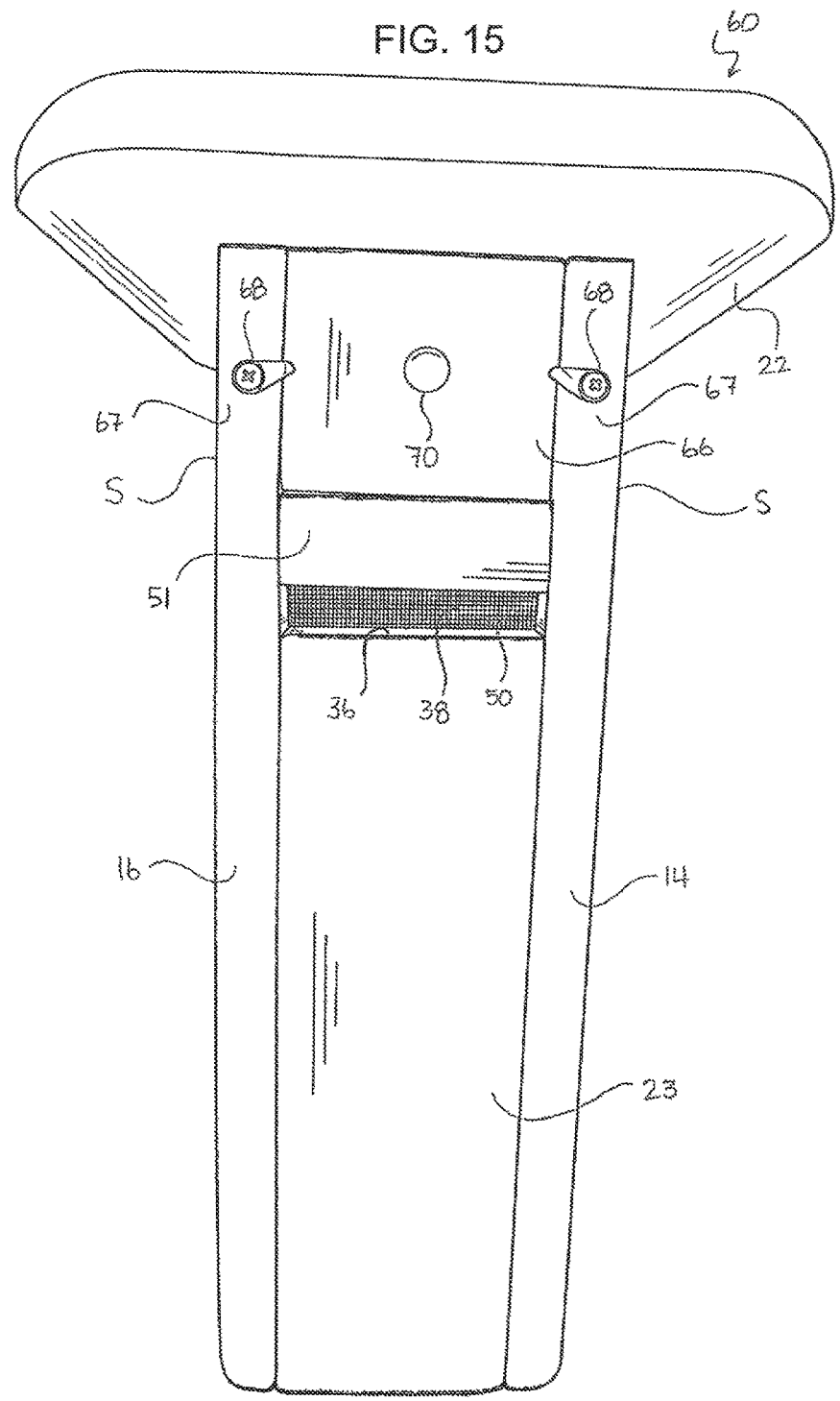
FIG. 15 is a rear view of the birdhouse of FIG. 13.
Figure 16:
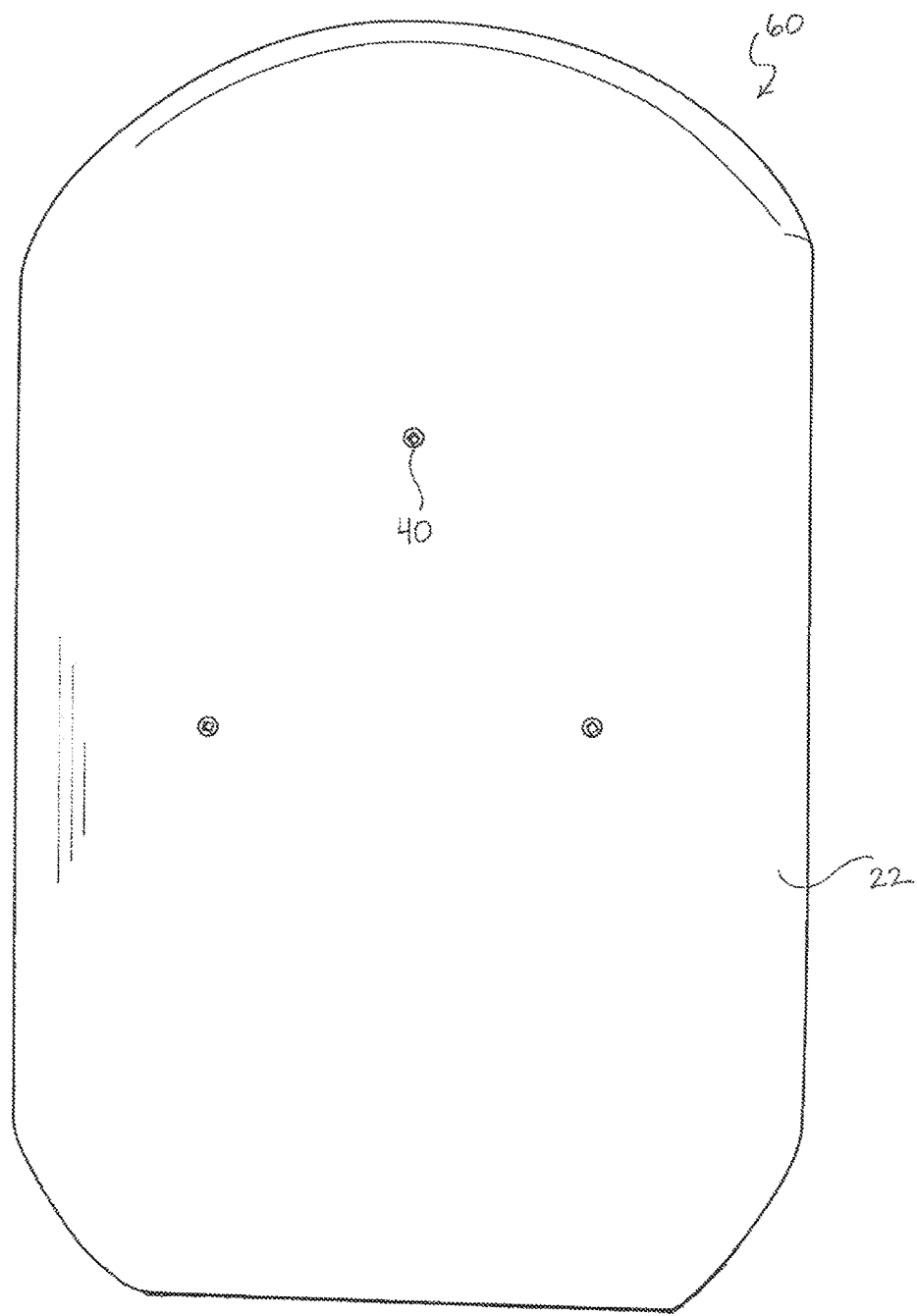
FIG. 16 is a top view of the birdhouse of FIG. 13.
Figure 17:
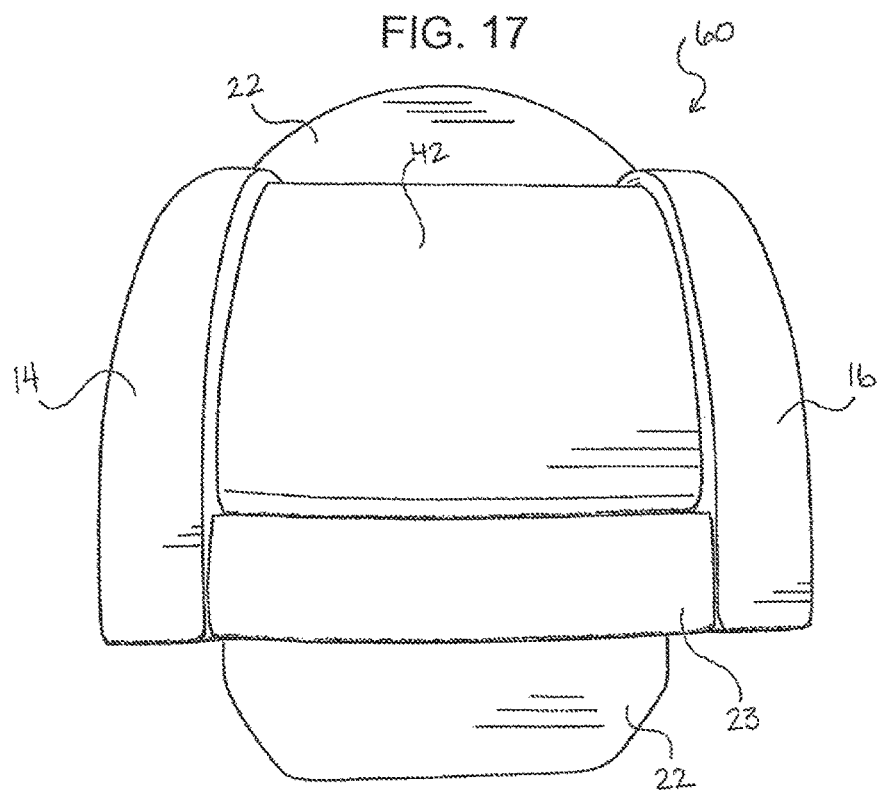
FIG. 17 is a bottom view of the birdhouse of FIG. 13.
Figure 18:
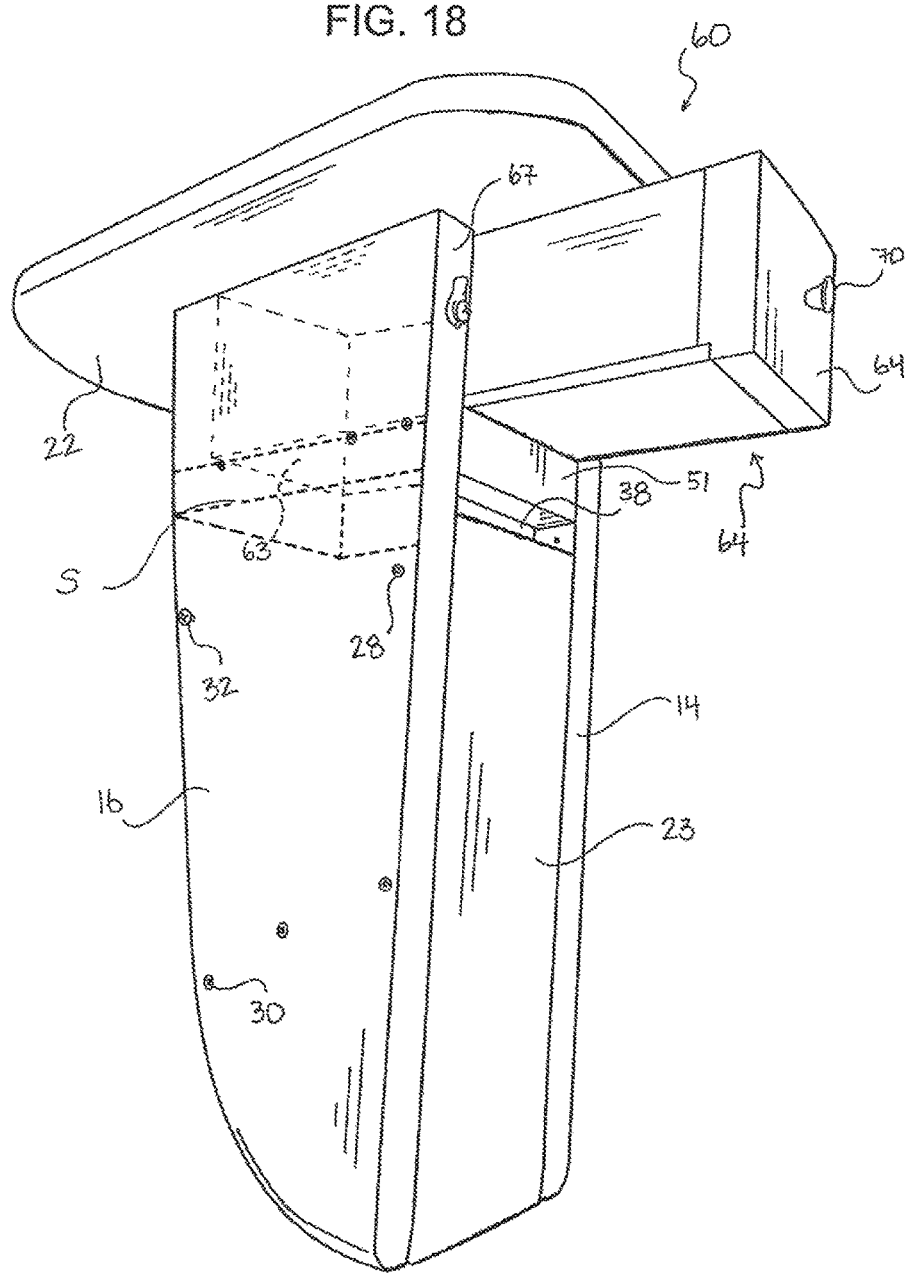
FIG. 18 is a side perspective view of the birdhouse of FIG. with a compartment with rear-opening drawer, with drawer in open position.

Optionally, the drawer 64 is secured via removable restraints 68 when in the closed position. FIGS. 14, 15, and 18 show the removable restraints 68 as rotatable keepers secured to the rear face of the side walls 14, 16 with hardware screws, however, it should be noted that the removable restraints 68 are not limited to rotatable keepers and may include any number of fasteners, latches, or other hardware mechanisms. Additionally, a drawer handle 70 is provided and affixed to the drawer face 66 to facilitate caregiver access to the drawer 64.

In a preferred embodiment, the drawer 64 is dimensioned to accommodate the following birdhouse maintenance kit: at least one of a bar of soap, used to coat the interior and exterior horizontal surfaces of the birdhouse 60 to prevent the attachment of wasp or hornet nests; a scraper or putty knife and a brush, used to clean the birdhouse interior; VASELINE® petroleum jelly, applied to a birdhouse pole or support to prevent ants from climbing the pole and accessing the birdhouse; TERRO® ant killer dust, sprinkled under an ant infested bird nest to rid the birdhouse of ants; diatomaceous earth powder, to prevent blow-flies from entering the birdhouse and infesting the nest; a laundry bag and Van Ert Trap sparrow trap, used to capture and remove sparrows, particularly European House Sparrows, or other unwanted birds or animals from the birdhouse interior 13; and/or any other items useful to the birder for birdhouse maintenance, cleaning, or otherwise.

While particular embodiments of the present birdhouse with enhanced caregiver access have been described herein, it will be appreciated by those skilled in the art that changes and modifications may be made thereto without departing from the invention in its broader aspects and as set forth in the following claims.

The invention claimed is:

1. A birdhouse, comprising:
   at least four walls defining a birdhouse interior, one of said walls having an access opening;
   a roof, defining a first, upper end of said interior, affixed to at least one of the walls, disposed above a floor, defining a second, opposite end of said interior, affixed to at least one of the walls; and
   a cell phone slot disposed generally adjacent to a top of at least one of said walls and being on said wall opposite said access opening, said slot being dimensioned to slidably accommodate a cell phone with a camera for photographing or monitoring the birdhouse interior.

2. The birdhouse of claim 1, further including a ceiling disposed immediately below the roof and generally above the birdhouse interior, said ceiling having a perimeter generally defined by the at least four walls, said ceiling being affixed to at least one of the walls and/or the roof, and said cell phone slot being disposed below said ceiling.

3. The birdhouse of claim 2, wherein a flexible screen is affixed to the ceiling within the birdhouse interior, dimensioned so as to completely cover the cell phone slot, and affixed so as to be flush with a cell phone slot interior opening.

4. The birdhouse of claim 3, wherein the flexible screen is affixed to the birdhouse ceiling between the birdhouse roof and a screen securement panel, which is disposed generally above the cell phone slot and is affixed to at least one of the walls, ceiling, and/or the roof.

5. The birdhouse of claim 2, wherein a flexible screen is affixed between the birdhouse ceiling and a screen securement panel, which is disposed generally above the cell phone slot and is affixed to at least one of the walls, the roof, or the ceiling; said screen being within the birdhouse interior, dimensioned to completely cover the cell phone slot, and affixed so as to be flush with a cell phone slot interior opening.

6. The birdhouse of claim 1, wherein at least two of said walls having a top width and a bottom width, said top width being greater than said bottom width.

7. The birdhouse of claim 1, wherein at least one of said walls is hinged around a pivot point and which is removably restrained so that the wall is movable between an open position, when a removable restraint is released and the wall is pivoted in a first direction about the pivot point, and a closed position, when the wall is pivoted in a second direction, opposite the first, about the pivot point, and the removable restraint is engaged.

8. The birdhouse of claim 7, wherein the pivot point of the wall is generally adjacent to a bottom of said wall and the restraint is generally adjacent to a top of said wall.

9. The birdhouse of claim 1, wherein a tool is removably affixed to an exterior of one of the walls.

10. The birdhouse of claim 1, further comprising a storage area disposed beneath the floor.

11. The birdhouse of claim 10, wherein said storage area comprises a chamber defined by at least three of said at least four walls, the floor of said birdhouse, and a cover which comprises a removable panel such that the panel encloses the storage area.

12. The birdhouse of claim 11, wherein the cover is hinged around a pivot point and which is removably restrained so that the cover is movable between an open position, when a removable restraint is released and the wall is pivoted in a first direction about the pivot point, and a closed position, when the wall is pivoted in a second direction, opposite the first, about the pivot point, and the removable restraint is engaged.

13. The birdhouse of claim 12, wherein the pivot point is located generally adjacent to a bottom of said cover and the restraint is located generally adjacent to a top of said cover.

14. The birdhouse of claim 1, further comprising a storage area disposed above the birdhouse interior.

15. The birdhouse of claim 14, wherein the storage area is accessible via a drawer that opens to a rear of the birdhouse.

16. The birdhouse of claim 15, wherein the drawer is further secured via removable restraints affixed to an outside face of at least one wall.

17. The birdhouse of claim 1, further comprising a maintenance kit comprising:
   a bar of soap;
   a scraper or putty knife and a brush;
   VASELINE® petroleum jelly;
   TERRO® ant killer dust;
   diatomaceous earth powder; and
   a laundry bag and Van Ert, sparrow trap.

18. A birdhouse, comprising:
at least four walls defining a birdhouse interior, at least one of said walls having an access opening;
a roof, defining a first, upper end of said interior, affixed to at least one of the walls, disposed above a floor, defining a second, opposite end of said interior, affixed to at least one of the walls;
a cell phone slot disposed generally adjacent to a top of at least one of said walls, said slot being dimensioned to slidably accommodate a cell phone with a camera for photographing or monitoring the birdhouse interior;
a base of mesh disposed above and contacting a top of the floor, which provides support for a nest; and
a mesh member affixed to an interior face of at least one of the walls, which covers a majority of the interior face.

19. A birdhouse, comprising:
four walls defining a birdhouse interior, one of said walls having an access opening, one of said walls being a rear wall having vertical edges and being opposite said wall having said access opening;
a roof defining an upper end of said interior, which is disposed above and is affixed to at least one of the walls, having an area larger than a perimeter of said four walls, thus creating an overhang which produces a first shaded area under said overhang;
at least one cooling fin attached to and extending away from two of said walls which oppose each other, wherein said cooling fins create a second shaded area on each said wall having said fin under said cooling fin, said second shaded area being disposed below said first shaded area on said side walls;
a floor defining a lower end of said interior, which is affixed to at least one of the walls; and
said at least one cooling fin and said roof extending laterally past vertical edges of said rear wall.

20. The birdhouse of claim 19, wherein a cell phone slot is disposed generally adjacent to a top of at least one of the walls, said slot being dimensioned to slidably accommodate a cell phone with a camera for photographing the birdhouse interior.

21. A birdhouse, comprising:
at least four walls defining a birdhouse interior, at least one of said walls having an access opening;
a roof, defining a first, upper end of said interior, affixed to at least one of the walls, disposed above a floor, defining a second, opposite end of said interior, affixed to at least one of the walls;
a cell phone slot disposed generally adjacent to a top of at least one of said walls, said slot being dimensioned to slidably accommodate a cell phone with a camera for photographing or monitoring the birdhouse interior; and
a flexible screen is affixed to a ceiling disposed below the roof and above the birdhouse interior, said screen dimensioned to completely cover said cell phone slot, and affixed so as to be flush with a cell phone slot interior opening.

22. A birdhouse, comprising:
at least four walls defining a birdhouse interior, at least one of said walls having an access opening;
a roof, defining a first, upper end of said interior, affixed to at least one of the walls, disposed above a floor, defining a second, opposite end of said interior, affixed to at least one of the walls;
a cell phone slot disposed generally adjacent to a top of at least one of said walls, said slot being dimensioned to slidably accommodate a cell phone with a camera for photographing or monitoring the birdhouse interior; and
a tool is removably affixed to an exterior of one of the walls.

23. A birdhouse, comprising:
at least four walls defining a birdhouse interior, one of said walls having an access opening;
a roof, defining a first, upper end of said interior, affixed to at least one of the walls, disposed above a floor, defining a second, opposite end of said interior, affixed to at least one of the walls;
a cell phone slot disposed generally adjacent to a top of one of said walls apart from said wall having said access opening, said slot being dimensioned to slidably accommodate a cell phone with a camera for photographing or monitoring the birdhouse interior; and
a ceiling disposed immediately below the roof and generally above the birdhouse interior, said ceiling having a perimeter generally defined by the at least four walls, said ceiling being affixed to at least one of the walls and/or the roof, and said cell phone slot being disposed below said ceiling.

24. A birdhouse, comprising:
at least four walls defining a birdhouse interior, at least one of said walls having an access opening;
a roof, defining a first, upper end of said interior, affixed to at least one of the walls, disposed above a floor, defining a second, opposite end of said interior, affixed to at least one of the walls;
a cell phone slot disposed generally adjacent to a top of at least one of said walls, said slot being dimensioned to slidably accommodate a cell phone with a camera for photographing or monitoring the birdhouse interior; and
a maintenance kit comprising:
a bar of soap;
a scraper or putty knife and a brush;
VASELINE® petroleum jelly;
TERRO® ant killer dust; and
diatomaceous earth powder.

* * * * *